US011544561B2

(12) United States Patent
Mittal et al.

(10) Patent No.: US 11,544,561 B2
(45) Date of Patent: Jan. 3, 2023

(54) TASK-AWARE RECOMMENDATION OF HYPERPARAMETER CONFIGURATIONS

(71) Applicant: Microsoft Technology Licensing, LLC, Redmond, WA (US)

(72) Inventors: Gaurav Mittal, Redmond, WA (US); Victor Manuel Fragoso Rojas, Bellevue, WA (US); Nikolaos Karianakis, Redmond, WA (US); Mei Chen, Bellevue, WA (US); Chang Liu, Medford, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 316 days.

(21) Appl. No.: 16/875,782

(22) Filed: May 15, 2020

(65) Prior Publication Data

US 2021/0357744 A1 Nov. 18, 2021

(51) Int. Cl.
*G06N 3/08* (2006.01)
*G06K 9/62* (2022.01)

(52) U.S. Cl.
CPC ............ *G06N 3/08* (2013.01); *G06K 9/6215* (2013.01); *G06K 9/6232* (2013.01); *G06K 9/6262* (2013.01)

(58) Field of Classification Search
CPC .. G06K 9/6227; G06K 9/6262; G06K 9/6215; G06V 10/82; G06N 3/0454; G06N 3/08; G06N 3/04; G06N 20/00
See application file for complete search history.

(56) References Cited

U.S. PATENT DOCUMENTS

| | | | | |
|---|---|---|---|---|
| 10,997,503 | B2* | 5/2021 | Dohan | G06N 3/086 |
| 11,144,831 | B2* | 10/2021 | Huang | G06N 3/082 |
| 2014/0344193 | A1 | 11/2014 | Bilenko et al. | |
| 2018/0121814 | A1 | 5/2018 | Yu et al. | |
| 2019/0042887 | A1 | 2/2019 | Nguyen et al. | |
| 2020/0104687 | A1 | 4/2020 | Gesmundo | |

(Continued)

FOREIGN PATENT DOCUMENTS

WO 2019108923 A1 6/2019

OTHER PUBLICATIONS

Li, et al., "Multi-Adversarial Partial Transfer Learning With Object-Level Attention Mechanism for Unsupervised Remote Sensing Scene Classification", in Journal of the IEEE Access, vol. 8, Mar. 20, 2020, pp. 56650-56665.

(Continued)

*Primary Examiner* — Li Liu
(74) *Attorney, Agent, or Firm* — Workman Nydegger

(57) ABSTRACT

Providing a task-aware recommendation of hyperparameter configurations for a neural network architecture. First, a joint space of tasks and hyperparameter configurations are constructed using a plurality of tasks (each of which corresponds to a dataset) and a plurality of hyperparameter configurations. The joint space is used as training data to train and optimize a performance prediction network, such that for a given unseen task corresponding to one of the plurality of tasks and a given hyperparameter configuration corresponding to one of the plurality of hyperparameter configurations, the performance prediction network is configured to predict performance that is to be achieved for the unseen task using the hyperparameter configuration.

20 Claims, 15 Drawing Sheets

(56) References Cited

U.S. PATENT DOCUMENTS

| | | | |
|---|---|---|---|
| 2020/0125945 A1 | 4/2020 | Lee et al. | |
| 2020/0257961 A1* | 8/2020 | Hua | G06N 3/04 |
| 2021/0224585 A1* | 7/2021 | Schmidt | G06N 7/005 |
| 2021/0256422 A1* | 8/2021 | Unterthiner | G06K 9/6265 |
| 2021/0312276 A1* | 10/2021 | Rawat | G06N 3/08 |
| 2021/0350203 A1* | 11/2021 | Das | G06N 3/082 |
| 2022/0044094 A1* | 2/2022 | Zheng | G06N 3/082 |
| 2022/0121906 A1* | 4/2022 | Kokiopoulou | G06N 3/0454 |

OTHER PUBLICATIONS

Liu, et al., "Adversarial Multi-task Learning for Text Classification", in Proceedings of the 55th Annual Meeting of the Association for Computational Linguistics, Apr. 19, 2017, 10 Pages.

Mittal, et al., "HyperSTAR: Task-Aware Hyperparameters for Deep Networks", https://arxiv.org/abs/2005.10524, May 21, 2020, 10 Pages.

"International Search Report and Written Opinion Issued in PCT Application No. PCT/US2021/028520", dated Jul. 30, 2021, 13 Pages.

Achille, et al., "Task2vec: Task Embedding for Meta-Learning", in Journal of Computing Research Repository, Feb. 10, 2019, 15 Pages.

Bardenet, et al., "Collaborative Hyperparameter Tuning", in Proceedings of the 30th International Conference on Machine Learning, Feb. 13, 2013, 09 Pages.

Bergstra, et al., "Random Search for Hyper-Parameter Optimization", in Journal of Machine Learning Research, vol. 13, Feb. 2012, pp. 281-305.

Bossard, et al., "Food-101—Mining Discriminative Components with Random Forests", in Proceedings of European Conference on Computer Vision, Sep. 6, 2014, pp. 1-16.

Chen, et al., "Ranking Measures and Loss Functions in Learning to Rank", in Journal of Advances in Neural Information Processing Systems, Dec. 7, 2009, 09 Pages.

Cimpoi, et al., "Describing Textures in the Wild", in Proceedings of the IEEE Conference on Computer Vision and Pattern Recognition, Jun. 23, 2014, 08 Pages.

Deng, et al., "Imagenet: A Large-scale Hierarchical Image Database", in IEEE Conference on Computer Vision and Pattern Recognition, Jun. 20, 2009, pp. 248-255.

Donahue, et al., "DeCAF: A Deep Convolutional Activation Feature for Generic Visual Recognition", in Proceedings of the 31st International Conference on Machine Learning, Jan. 27, 2014, 09 Pages.

Falkner, et al., "BOHB: Robust and Efficient Hyperparameter Optimization at Scale", in Proceedings of the 35th International Conference on Machine Learning, Jul. 10, 2018, 10 Pages.

Feurer, et al., "Efficient and Robust Automated Machine Learning", in in Journal of Advances in Neural Information Processing Systems, Dec. 7, 2015, 09 Pages.

Feurer, et al., "Initializing Bayesian Hyperparameter Optimization via Meta-Learning", in Proceedings of Twenty-Ninth AAAI Conference on Artificial Intelligence, Feb. 16, 2015, pp. 1128-1135.

Franceschi, et al., "Forward and Reverse Gradient-Based Hyperparameter Optimization", in Proceedings of the 34th International Conference on Machine Learning, Aug. 6, 2017, 09 Pages.

Ganin, et al., "Unsupervised Domain Adaptation by Backpropagation", in Journal of Computing Research Repository, Sep. 26, 2014, 10 Pages.

Gilley, et al., "Tune Hyperparameters for Your Model with Azure Machine Learning", Retrieved from: https://docs.microsoft.com/en-us/azure/machine-learning/how-to-tune-hyperparameters, Mar. 30, 2020, 15 Pages.

Griffin, et al., "Caltech-256 Object Category Dataset", in Technical report—TR-2007-001, Apr. 19, 2007, pp. 1-20.

He, et al., "Deep residual learning for image recognition", in Proceedings of IEEE Conference on Computer Vision and Pattern Recognition, Jun. 27, 2016, pp. 770-778.

Hoffman, et al., "CyCADA: Cycle-Consistent Adversarial Domain Adaptation", in Proceedings of the 35th International Conference on Machine Learning, Jul. 10, 2018, 10 Pages.

Hu, et al., "Squeeze- and-Excitation Networks", in Proceedings of IEEE Conference on Computer Vision and Pattern Recognition, Jun. 18, 2018, pp. 7132-7141.

Huang, et al., "Densely Connected Convolutional Networks", in Proceedings of the IEEE Conference on Computer Vision and Pattern Recognition, Jul. 21, 2017, pp. 4700-4708.

Hutter, et al., "Automated Machine Learning: Methods, Systems, Challenges", in Publication of the Springer Series on Challenges in Machine Learning, 2019, 222 Pages.

Iwana, et al., "Judging a Book by its Cover", in Journal of Computing Research Repository, Oct. 28, 2016, 05 Pages.

Jamieson, et al., "Non-stochastic Best Arm Identification and Hyperparameter Optimization", in Proceedings of the 19th International Conference on Artificial Intelligence and Statistics, May 2, 2016, pp. 240-248.

Jerfel, et al., "Reconciling Meta-Learning and Continual Learning with Online Mixtures of Tasks", in Journal of Advances in Neural Information Processing Systems, Dec. 8, 2019, 18 Pages.

Jin, et al., "Auto-Keras: An Efficient Neural Architecture Search System", in Proceedings of the 25th ACM SIGKDD International Conference on Knowledge Discovery & Data Mining, Aug. 4, 2019, pp. 1946-1956.

Kandasamy, et al., "Multi-fidelity Bayesian Optimisation with Continuous Approximations", in Proceedings of the 34th International Conference on Machine Learning, Aug. 6, 2017, 10 Pages.

Karianakis, "Reinforced Temporal Attention and Split-Rate Transfer for Depth-Based Person Re-Identification", in Proceedings of the European Conference on Computer Vision, Sep. 2018, 18 Pages.

Kim, et al., "Learning to Warm-Start Bayesian Hyperparameter Optimization", in Repository of arXiv:1710.06219, Oct. 17, 2017, 16 Pages.

Kingma, et al., "Adam: A Method for Stochastic Optimization", in Proceedings of the International Conference on Learning Representations, May 7, 2015, 13 Pages.

Klein, et al., "Fast bayesian optimization of machine learning hyperparameters on large datasets", in Proceedings of the 20th International Conference on Artificial Intelligence and Statistics, Apr. 20, 2017, 09 Pages.

Klein, et al., "Learning Curve Prediction with Bayesian Neural Networks", in Proceedings of 5th International Conference on Learning Representations, Apr. 24, 2017, 16 Pages.

Kokiopoulou, et al., "Fast Task-Aware Architecture Inference", in Journal of Computing Research Repository, Feb. 15, 2019, 14 Pages.

Li, et al., "Exploiting Reuse in Pipeline-Aware Hyperparameter Tuning", in Journal of Computing Research Repository, Mar. 12, 2019, 13 Pages.

Li, et al., "Hyperband: A Novel Bandit-Based Approach to Hyperparameter Optimization", in Journal of Machine Learning Research, vol. 18, Issue 1, Apr. 2018, pp. 1-52.

Lindauer, et al., "Warmstarting of Model-Based Algorithm Configuration", in Proceedings of Thirty-Second AAAI Conference on Artificial Intelligence, Apr. 25, 2018, pp. 1355-1362.

Liu, et al., "Deepfashion: Powering robust clothes recognition and retrieval with rich annotations", in Proceedings of the IEEE conference on computer vision and pattern recognition, Jun. 27, 2016, pp. 1096-1104.

Ma, et al., "ShuffleNet V2: Practical Guidelines for Efficient CNN Architecture Design", in Proceedings of the 15th European Conference on Computer Vision, Sep. 8, 2018, 16 Pages.

Maclaurin, et al., "Gradient-based Hyperparameter Optimization through Reversible Learning", in Proceedings of the 32nd International Conference on Machine Learning, Jun. 1, 2015, 10 Pages.

Parkhi, et al., "Cats and Dogs", in Proceedings of the IEEE Conference on Computer Vision and Pattern Recognition, Jun. 16, 2012, pp. 34980-3505.

Pedregosa, Fabian, "Hyperparameter Optimization with Approximate Gradient", in Proceedings of the 33rd International Conference on Machine Learning, Feb. 7, 2016, 15 Pages.

(56) References Cited

OTHER PUBLICATIONS

Perrone, et al., "Scalable Hyperparameter Transfer Learning", in Proceedings of 32nd Conference on Neural Information Processing Systems, Dec. 3, 2018, 11 Pages.
Quattoni, et al., "Recognizing Indoor Scenes", in Proceedings of IEEE Conference on Computer Vision and Pattern Recognition, Jun. 20, 2009, pp. 413-420.
Robbins, et al., "A Stochastic Approximation Method", in Journal of the Annals of Mathematical Statistics, vol. 22, No. 3, Sep. 1951, pp. 400-407.
Simonyan, et al., "Very Deep Convolutional Networks for Large-Scale Image Recognition", in Journal of Computing Research Repository, Sep. 4, 2014, 10 Pages.
Snoek, et al., "Practical Bayesian Optimization of Machine Learning Algorithms", in the Proceedings of the International Conference on Neural Information Processing Systems, Dec. 3, 2012, 09 Pages.
Snoek, et al., "Scalable Bayesian Optimization Using Deep Neural Networks", in the Proceedings of the 32nd International Conference on International Conference on Machine Learning, Jul. 6, 2015, 10 Pages.
Swersky, et al., "Freeze-thaw Bayesian Optimization", in Journal of Computing Research Repository, Jun. 16, 2014, 12 Pages.
Swersky, et al., "Multitask Bayesian Optimization", in Proceedings of 27th Annual Conference on Neural Information Processing Systems, Dec. 5, 2013, 09 Pages.
Tzeng, et al., "Adversarial Discriminative Domain Adaptation", in Proceedings of the IEEE Conference on Computer Vision and Pattern Recognition, Jul. 23, 2017, pp. 7167-7176.
Vuorio, et al., "Multimodal Model-Agnostic Meta-Learning via Task-Aware Modulation", in Journal of Advances in Neural Information Processing Systems, Dec. 8, 2019, 12 Pages.
Wong, et al., "Transfer Learning with Neural AutoML", in Proceedings of 32nd Conference on Neural Information Processing Systems, Dec. 3, 2018, 10 Pages.
Wu, et al., "IP102: A Large-Scale Benchmark Dataset for Insect Pest Recognition", in Proceedings of the IEEE Conference on Computer Vision and Pattern Recognition, Jun. 16, 2019, pp. 8787-8796.
Xiao, et al., "SUN Database: Large-scale Scene Recognition from Abbey to Zoo", in Proceedings of IEEE Conference on Computer Vision and Pattern Recognition, Jun. 13, 2010, pp. 3485-3492.
Xue, et al., "Transferable AutoML by Model Sharing Over Grouped Datasets", in Proceedings of the IEEE Conference on Computer Vision and Pattern Recognition, Jun. 16, 2019, pp. 9002-9011.
Yogatama, et al., "Efficient Transfer Learning Method for Automatic Hyperparameter Tuning", in Proceedings of the 17th International Conference on Artificial Intelligence and Statistics, Apr. 22, 2014, pp. 1077-1085.
Yosinski, et al., "How Transferable are Features in Deep Neural Networks?", in Proceedings of Advances in Neural Information Processing Systems, Dec. 8, 2014, 9 Pages.
Zhou, et al., "Places: A 10 Million Image Database for Scene Recognition", in Journal of IEEE Transactions on Pattern Analysis and Machine Intelligence, vol. 40, Issue 6, Jun. 1, 2018, pp. 1452-1464.
Zoph, et al., "Neural Architecture Search with Reinforcement Learning", in Journal of Computing Research Repository, Nov. 5, 2016, 15 Pages.

\* cited by examiner

Algorithm 1: Offline Meta-learning Phase

1. Input meta-dataset $\mathcal{T}$, $M$ datasets, hyperparameter batch size $O_{hyper}$, image batch size $N_{img}$, number of sampled image batches per dataset $B_{img}$, window size $L$
2. while *Not converge* do
3.    for $m=1$ *to* $M$ do
4.       Initialize global task embedding $t_m^G = 0$
5.       Sample hyperparameter batch $\mathcal{C}_m$ from $\mathcal{T}$ for dataset $\mathcal{D}_m$
6.       for $i=1$ *to* $B_{img}$ do
7.          Sample an image batch $\mathcal{B}_m^i$ from $\mathcal{D}_m$
8.          Update $\theta$, $w_t$, $w_s$ by minimizing Eq. (4)
9.          Compute $t_m^G$ as mean of up to last $L$ image batches
10.          Update $w_d$ by maximizing Eq. (4);
11.       end
12.    end
13. end

*Fig. 7*

Algorithm 2: Online Recommendation Phase

1 Input Unseen dataset $D_{new}$, meta-dataset $\mathcal{T}$, batch sampling iterations $B$, number of hyperparameter configurations $H$
2 for $n=1$ to $H$ do
3    Get the $n$-th hyperparameter configuration $c_n$ from $\mathcal{T}$
4    for $i=1$ to $B$ do
5      Randomly sample an image batch $\mathcal{B}_{new}^i$ from $D_{new}$;
6      $v_{n,i} = f_\theta\left(g_{w_t}(\mathcal{B}_{new}^i), h_{w_s}(c_n)\right)$
7    end
8    $v_n = \frac{1}{B}\sum_i^B v_{n,i}$
9 end
10 Return ranked configurations $c_1, \ldots, c_N$ based on $v_1, \ldots, v_N$

*Fig. 9*

| Training Parameter | Value |
|---|---|
| Framework | Pytorch v1.2 |
| Initial Learning Rate | 0.001 |
| Learning Rate Scheduler | StepLR |
| Learning Rate Epoch Step Size | 150 |
| Learning Rate Step Decay | 0.1 |
| Maximum Epochs | 500 |
| Image Batch Size | 64 |
| Hyperparameter Batch Size | 16 |
| Image Size | $256 \times 256$ |
| Random Crop Size | $224 \times 224$ |
| Image Normalize Mean | [0.482, 0.459, 0.408] |
| Image Normalize Std | [1., 1., 1.] |
| Random Scale Range | (0.8, 1.2) |
| Random Rotation Range | $(-10°, 10°)$ |
| Random Translation Range | $X, Y \in (-0.07, 0.07)$ |

*Fig. 10*

| Hyperparameter | Range |
|---|---|
| Data Augmentation | {Random Crop, Random Affine (Crop+Scale+Rotate+Translate)} |
| Optimizer + LR Multiplier | {(SGD, 1), (SGD, 5), (SGD, 10), (Adam, 1)} |
| Layers upto which to finetune | {classifier, 5.2, 5.1, 4.6, 4.3} |

Fig. 11A

| Hyperparameter | Range |
|---|---|
| Data Augmentation | {Random Crop, Random Affine (Crop+Scale+Rotate+Translate)} |
| Optimizer + LR Multiplier | {(SGD, 1), (SGD, 5), (SGD, 10)} |
| Layers upto which to finetune | {classifier, 2.1, 1.7, 1.5, 1.3, 1.0} |
| Base Learning Rate | {0.001, 0.003, 0.01} |

Fig. 11B

| Dataset | num_train_images | num_classes | avg_image_per_class | log(num_train_images) | log(num_classes) | log(image_per_class) |
| --- | --- | --- | --- | --- | --- | --- |
| MIT Indoor | 5350 | 67 | 79.85 | 8.58 | 4.20 | 4.38 |
| Oxford-IIIT Pets | 3680 | 37 | 99.46 | 8.21 | 3.61 | 4.60 |
| Caltech256 | 22955 | 257 | 89.32 | 10.04 | 5.55 | 4.49 |
| Food101 | 3030 | 101 | 30.00 | 8.02 | 4.62 | 3.40 |
| Places365 | 10950 | 365 | 30.00 | 9.30 | 5.90 | 3.40 |
| DeepFashion | 2300 | 46 | 50.00 | 7.74 | 3.83 | 3.91 |
| BookCover30 | 5700 | 30 | 190.00 | 8.65 | 3.40 | 5.25 |
| IP102 (Pests) | 4080 | 102 | 40.00 | 8.31 | 4.62 | 3.69 |
| Sun397 | 20549 | 397 | 51.76 | 9.93 | 5.98 | 3.95 |
| Textures (DTD) | 3760 | 47 | 80.00 | 8.23 | 3.85 | 4.38 |

*Fig. 12*

TASK-AWARE RECOMMENDATION OF HYPERPARAMETER CONFIGURATIONS

BACKGROUND

Using models pre-trained on large datasets such as ImageNet for transfer learning on a new task has become a de-facto practice to push the performance boundary on several computer vision tasks, most notably image classification. While deep neural networks excel in solving visual recognition tasks, they require significant effort to find hyperparameters that make them work optimally. A hyperparameter (e.g., learning rate, layers to fine-tune, optimizer, etc.) is a parameter whose value is set before the learning process begins.

Transfer learning (TL) is a research problem in machine learning (ML) that focuses on storing knowledge gained while solving one problem and applying it to a different but related problem. Although transfer learning improves performance on new tasks, it requires ML experts spending hours finding the right hyperparameters.

Automated Machine Learning (AutoML) is a machine learning paradigm which automates the process of searching neural network architectures, via Neural Architecture Search (NAS) and associated hyperparameters, via Hyperparameter Optimization systems (HPO), with little or no manual intervention. AutoML enables deep learning to be used in systems/applications without requiring expert knowledge. It helps democratize the use of Deep Learning by reducing the need for Deep Learning expertise in application development.

Researchers have relied on HPO, ranging from simple random search to sophisticated Bayesian Optimization (BO), Hyperband (BB) and BOBB to reduce manual effort and automate the process of finding the optimal hyperparameters. Though more effective than manual search, these approaches are still slow since most of them trigger the same procedure for any new task and do not leverage any information from past experiences on related tasks.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to systems and methods for task-aware recommendation of hyperparameters for neural network architectures. A neural network architecture may be a deep-learning based image classifier, including (but not limited to) SE-ResNeXt50 and/or ShuffleNet-v2-x1.

The system for task-aware recommendation of hyperparameters (hereinafter, also referred to as "the system") first accesses a plurality of tasks and a plurality of hyperparameter configurations. Each of the tasks corresponds to a dataset. Based on the tasks and hyperparameter configurations, The system constructs a joint space of tasks and hyperparameter configurations that includes a plurality of combinations (e.g., triplets). Each combination includes (1) one of the plurality of the tasks corresponding to a dataset, (2) one of the plurality of hyperparameter configurations, and (3) a performance score indicating a performance achieved for the corresponding task using the corresponding hyperparameter configuration. The system then uses the constructed joint space as training data to train and optimize a performance prediction network for predicting performance of hyperparameter configurations for unseen datasets, predicting a performance score of the neural network architecture for an unseen task of the plurality of tasks based on a hyperparameter configuration of the plurality of hyperparameter configurations. An unseen task is a task that The system has "not seen" before during training, i.e., not included in the joint space.

In some embodiments, the training and optimizing the performance prediction network includes (1) training a task representation network using the plurality of tasks; (2) training a hyperparameter configuration representation network using the plurality of hyperparameter configurations; and (3) joint training the performance prediction network using outputs of the task representation network and the hyperparameter configuration representation network. Since the process of training and optimizing the performance prediction network can be performed offline at the ML service provider's site, this process may also be called an offline meta-training or meta-learning process.

After the performance prediction network of the system is trained and optimized, when an unseen dataset is fed into the system, the system extracts a task corresponding to the unseen dataset, and uses the performance prediction network to predict performance that is to be achieved for the task using one of the plurality of training hyperparameter configurations. For example, the system may extract the task corresponding to the unseen dataset using the previously trained task representation network and then predict a performance score for each of the plurality of hyperparameter configurations contained in the joint space, and rank the plurality of performance scores (each of which corresponding to a hyperparameter configuration). Based on the ranking, the system can provide recommendations to a user and/or a task-agnostic HPO, such that the task-agnostic HPO can warm-start from the top ranked hyperparameter configurations. Since the process of predicting and recommending can be provided to a remote user as an online service, this process may also be called an online recommendation phase.

By learning over the joint space of tasks and hyperparameter configurations, The system is able to effectively predict and rank hyperparameters in an end-to-end manner directly from raw images, and save hours of time and effort required for hyperparameter search and recommendation in a task-aware manner based on visually grounded task representations.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which:

FIG. 7 illustrates an example training algorithm for offline meta-learning phase;

FIG. 9 illustrates an example recommendation algorithm for online recommendation phase;

FIG. 10 illustrates a list of example training parameters and their corresponding example values;

FIGS. 11A and 11B illustrate two lists of example hyperparameters that may be used as part of the hyperparameter configurations;

FIG. 12 illustrates a list of example datasets (tasks) that may be used to generate part of the joint space;

DETAILED DESCRIPTION

Figure 1:
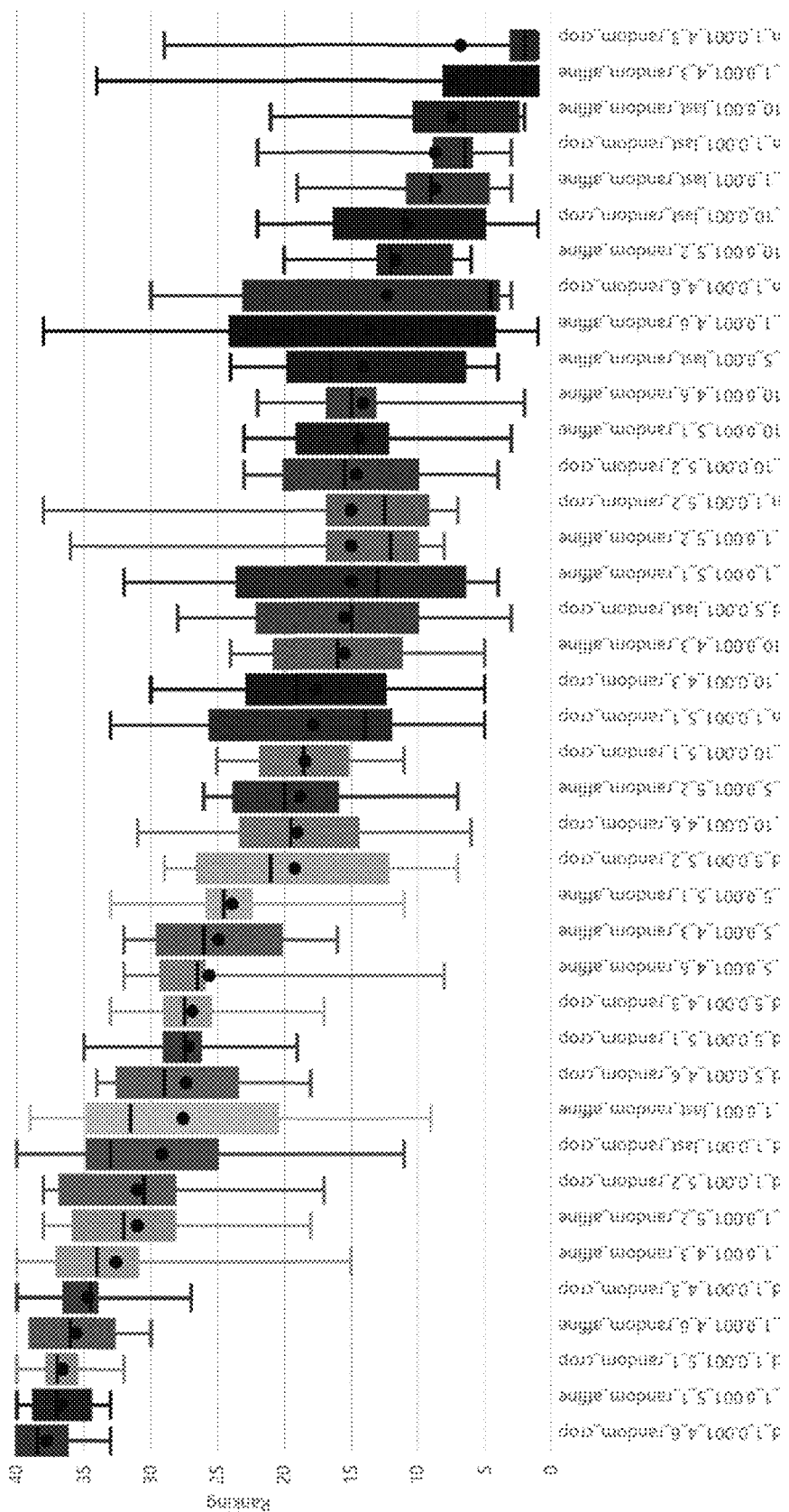
FIG. 1 illustrates a diversity in a ranking of different hyperparameter configurations for Se-ResNeXt-50.

The embodiments described herein are related to systems and methods for task-aware recommendation of hyperparameters (hereinafter also called "The system") for neural network architectures. The neural network architectures may be a deep-learning based image classifier, including (but not limited to) SE-ResNeXt50 and ShuffleNet-v2-x1.

The system first accesses a plurality of tasks and a plurality of hyperparameter configurations. Each of the tasks corresponds to a dataset. Based on the tasks and hyperparameter configurations, The system constructs a joint space of tasks and hyperparameter configurations that includes a plurality of combinations (e.g., triplets). Each combination includes (1) one of the plurality of the tasks corresponding to a dataset, (2) one of the plurality of hyperparameter configurations, and (3) a performance score indicating a performance achieved for the corresponding task using the corresponding hyperparameter configuration. The system then uses the constructed joint space as training data to train and optimize a performance prediction network for predicting performance of hyperparameter configurations for unseen datasets, predicting a performance score of the neural network architecture for an unseen task of the plurality of tasks based on a hyperparameter configuration of the plurality of hyperparameter configurations. An unseen task is a task that The system has "not seen" before during training, i.e., not included in the joint space.

In some embodiments, for each of the plurality of tasks and each of the plurality of hyperparameter configurations, The system determines a performance score indicating a performance achieved for the corresponding hyperparameter configuration. In some embodiments, each performance score includes a raw score of Top-1 accuracy achieved for a neural network architecture using the corresponding hyperparameter configuration on the corresponding training task. In some embodiments, the determination of a performance score further includes normalizing the raw scores based on a mean and a standard deviation over the raw scores. The normalized scores are then used as the performance scores in the joint space of tasks and hyperparameter configurations.

In some embodiments, the training and optimizing the performance prediction network includes (1) training a task representation network using the plurality of tasks; (2) training a hyperparameter configuration representation network using the plurality of hyperparameter configurations; and (3) joint training the performance prediction network using outputs of the task representation network and the hyperparameter configuration representation network. Since the process of training and optimizing the performance prediction network can be performed offline at the ML service provider's site, this process may also be called an offline meta-training or meta-learning process.

In some embodiments, the joint training (or joint learning) is configured to minimize the difference between the estimated performance of the performance prediction network and the performance scores. The difference between the estimated performance of the prediction network and the performance scores may be represented using a mean-based loss function.

In some embodiments, the joint learning further includes a regularizer or an adversarial training component. The regularizer is configured to penalize the learning performance prediction network by the mean-based loss function when the similarity of two task representations differs from a pre-computed task similarity between the two corresponding datasets. A difference between the similarity of two task representations and a pre-computed task similarity between the two corresponding datasets may be represented using a similarity loss function.

The adversarial training component is configured to keep batchwise task representations extracted from different batches of sampled data to be close to a global representation of the corresponding dataset. The adversarial training component is configured to obtain a plurality of batchwise task representations, each of which is extracted from a batch of predetermined number of sampled data contained in a dataset. The adversarial training component is also configured to compute the global representation of the dataset using the plurality of batchwise data representation and use a discriminator to ensure that each batchwise data representation is close to the global representation of the dataset. In some embodiments, the ensuring that each batchwise data representation is close to the global representation of the dataset includes penalizing a deviation between each batchwise task representation and the global representation. The deviation between each batchwise task representation and the global representation may be represented by an adversarial loss function.

In some embodiments, the joint learning includes taking into consideration of each of the mean-based loss function, the similarity loss function, and the adversarial loss function. Since the above-described learning process can be performed offline at a ML service provider's site, this process may also be called an offline meta-learning phase.

After the performance prediction network of the system is trained and optimized, when an unseen dataset is fed into the system, the system extracts a task corresponding to the unseen dataset, and uses the performance prediction network to predict performance that is to be achieved for the task using one of the plurality of training hyperparameter configurations. For example, the system may extract the task corresponding to the unseen dataset using the previously trained task representation network and then predict a performance score for each of the plurality of hyperparameter configurations contained in the joint space, and rank the plurality of performance scores (each of which corresponding to a hyperparameter configuration). Based on the ranking, the system can provide recommendations to a user and/or a task-agnostic HPO, such that the task-agnostic HPO can warm-start from the top ranked hyperparameter configurations. Since the process of predicting and recommending can be provided to a remote user as an online service, this process may also be called an online recommendation phase.

In some embodiments, before extracting the task or predicting a performance score, the unseen dataset may first be sampled into one or more batches of sampled datasets. The one or more batches of sampled datasets are then used to extract the task and/or predicting performance scores. For example, for each of the one or more batches of sampled datasets, a performance score may be determined for each hyperparameter configurations, and the one or more performance scores may be averaged to predict the overall performance score of each corresponding hyperparameter configuration. Since the process of predicting and recommending can be performed online to a remote user, this process may also be called an online recommendation phase.

By learning over the joint space of tasks and hyperparameter configurations and configuration space, The system is able to effectively predict and rank hyperparameters in an end-to-end manner directly from raw images, and save hours of time and effort required for hyperparameter search and recommendation in a task-aware manner based on visually grounded task representations.

Technical Improvements

The success of existing machine learning (ML) for visual classification tasks requires spending countless hours by ML experts to find the optimal hyperparameters which can achieve the best possible performance for the new dataset (i.e., task) for a given network architecture (e.g., Se-ResNeXt-50 and Shufflenet-v2-x1). One of the reasons for spending this large amount of time is the fact that a same set of hyperparameters are not optimal across all datasets. Given the visual nature of the target dataset, the hyperparameter configurations can differ significantly in their relative ranking in the hyperparameter configuration space based on the achieved performance (e.g., Top-1 accuracy). Top-1 accuracy is a conventional accuracy, which means that the result with the highest probability is the expected answer.

Figure 2:
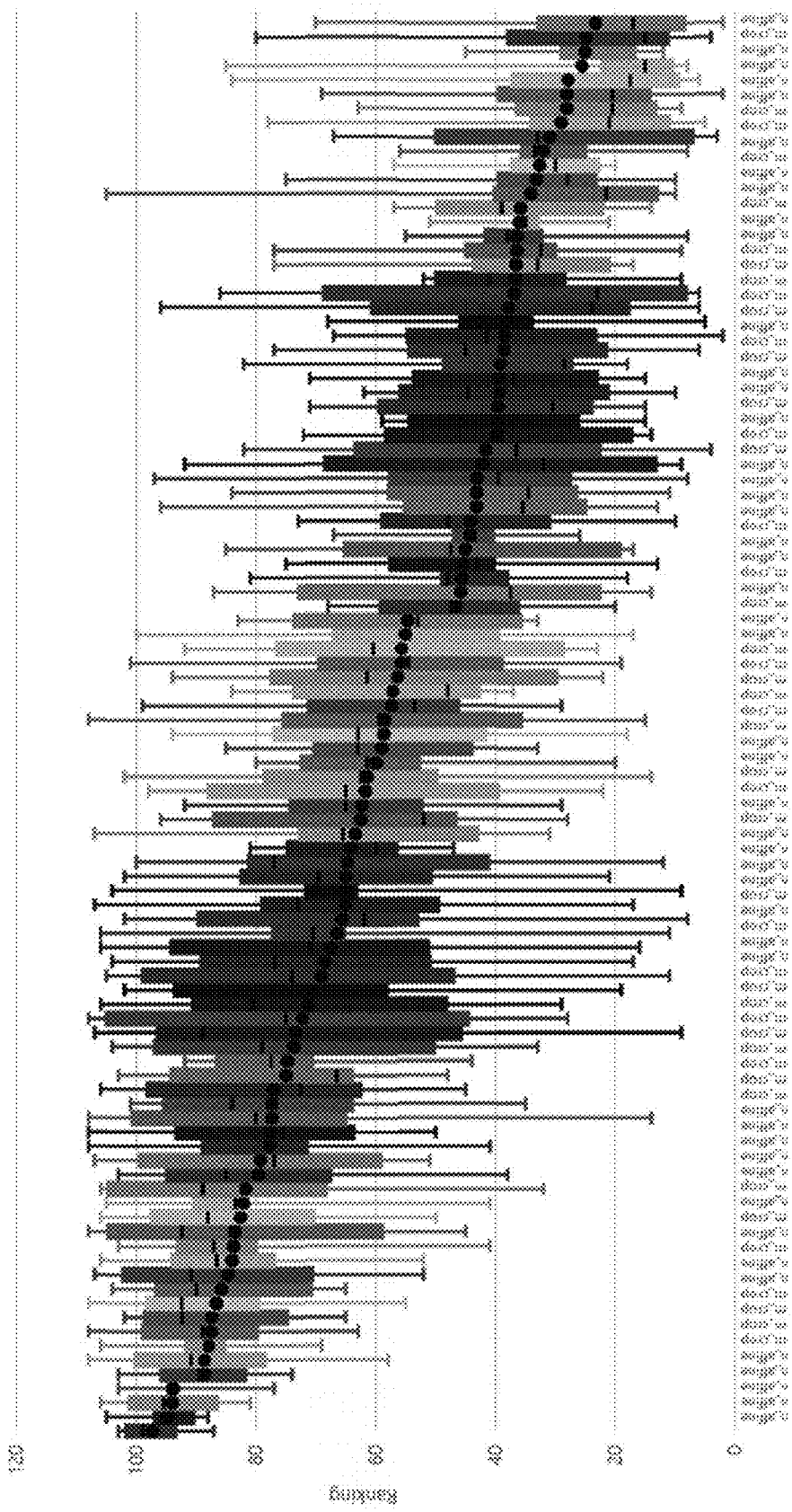
FIG. 2 illustrates a diversity in a ranking of different hyperparameter configurations for Shufflenet-v2-x1.

FIGS. 1 and 2 illustrate this diversity in a ranking of different hyperparameter configurations in the form of a box-whisker plot for Se-ResNeXt-50 and Shufflenet-v2-x1, respectively. In each plot, higher rank denotes the corresponding configuration achieving a better Top-1 accuracy compared to other configurations with lower ranks. Rank 1 denotes the configuration with least Top-1 accuracy, and Rank 40 (for SE-ResNeXt-50) of FIG. 1 or 180 (for ShuffleNet-v2-x1) of FIG. 2 denotes the configuration with the highest Top-1 accuracy for a dataset. The y-axis spans over this ranking while the x-axis spans over the different hyperparameter configurations (40 for SE-ResNeXt-50 and 108 for ShuffleNet-v2-x1). The configurations are ordered from left-to-right in the order of decreasing mean rank over 10 datasets.

It can be observed from both plots of FIGS. 1 and 2 that a large number of hyperparameter configurations show a significant variation in ranking across the 10 real-world image classification datasets. For instance, for many configurations for ShuffleNet-v2-x1, the ranking can be as high as 108 (best performance configuration) for one dataset and can be as low as 10 (really poor performing configuration) for another dataset at the same time.

Accordingly, the two plots confirm that there is no one hyperparameter configuration that performs consistently the best over the diverse set of visual classification datasets chosen for evaluation. Therefore, with every new dataset, there is a need to search the whole space of hyperparameter configurations to find the best performing configuration.

To reduce Hyperparameter Optimization (HPO) time, the current application presents The system to warm-start various HPO methods (e.g., Hyperband) for neural networks. The system ranks and recommends hyperparameters by predicting their performance conditioned on a joint dataset-hyperparameter space. By learning over the joint meta dataset-configuration space, The system is able to effectively predict and rank hyperparameters in an end-to-end manner directly from raw images, and save hours of time and effort required for hyperparameter search and recommendation in a task-aware manner based on visually grounded task representations.

The inventors have conducted extensive experiments on at least 10 publicly available large-scale image classification datasets over two different network architectures (including Se-ResNeXt-50 and Shufflenet-v2-x1), validating that The system evaluates 50% less configurations to achieve the best performance compared to many existing HPO methods, such as Bayesian Optimization (BO), Hyperband (BB), and BOHB. In particular, the experiments demonstrated that The system makes HB task-aware, achieving the optimal accuracy in just 25% of the budget required by both vanilla HB and BOHB.

Example Embodiments

The embodiments described herein are related to systems and methods for task-aware recommendation of hyperparameters for network architectures (e.g., SE-ResNeXt50, ShuffleNet-v2-x1, etc.).

Figure 3:
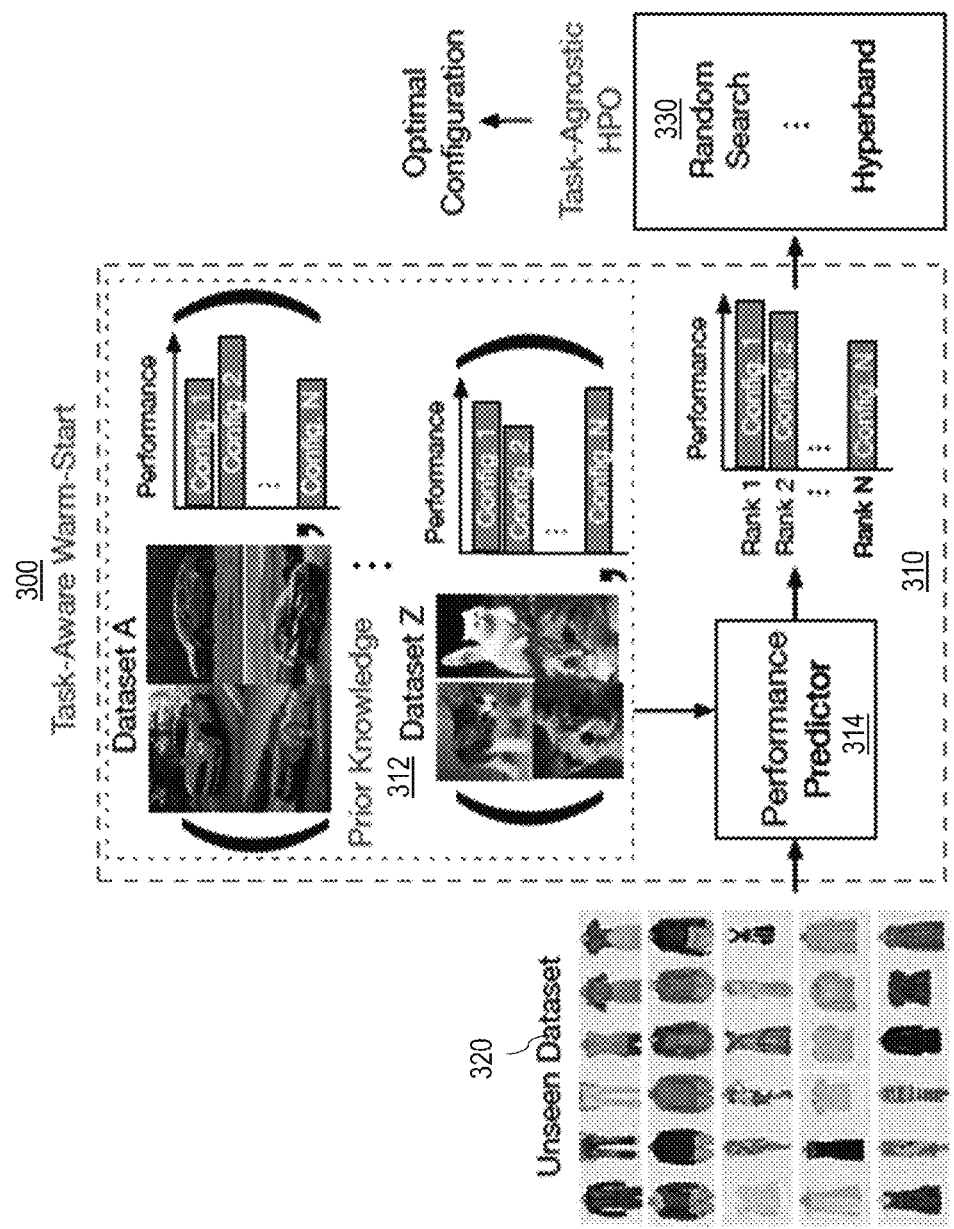
FIG. 3 illustrates an example environment, in which The system may be implemented.

FIG. 3 illustrates an example environment 300, in which an example system 310 for the take-aware recommendation of hyperparameters may be implemented. As illustrated in FIG. 3, The system 310 learns from prior knowledge 312 to generate a performance prediction network 314. The prior knowledge 312 includes multiple training datasets (e.g., datasets A through Z) and multiple hyperparameter configurations (e.g., Configs. 1 through N). Each dataset corresponds to a task (e.g., a classification task). For example, dataset A includes pictures of cars, which may correspond to a classification task that is configured to classify cars into different types. As another example, dataset Z includes image of cats, which may correspond to a classification task that is configured to classify cats into different cat breeds. Based on the training datasets and the hyperparameter configurations, the performance of each hyperparameter configurations applied to each dataset may be determined. The training datasets, hyperparameter configurations, and their corresponding performances form a joint space of tasks and hyperparameter configurations. The system 310 then learns from the joint space of tasks and hyperparameter configurations to generate a performance prediction network 314 (also called a performance predictor).

When an unseen dataset 320 is fed into the system 310, the performance prediction network 314 determines a performance (e.g., a performance score) for each of the hyperparameter configurations (e.g., Configs. 1 through N), and rank the performances for each of the hyperparameter configurations. The system 310 then sends the ranking result to a task-agnostic HPO (e.g., Hyperband 330), such that the task-agnostic HPO 330 can warm start from the top-ranked hyperparameter configurations.

Figure 4:
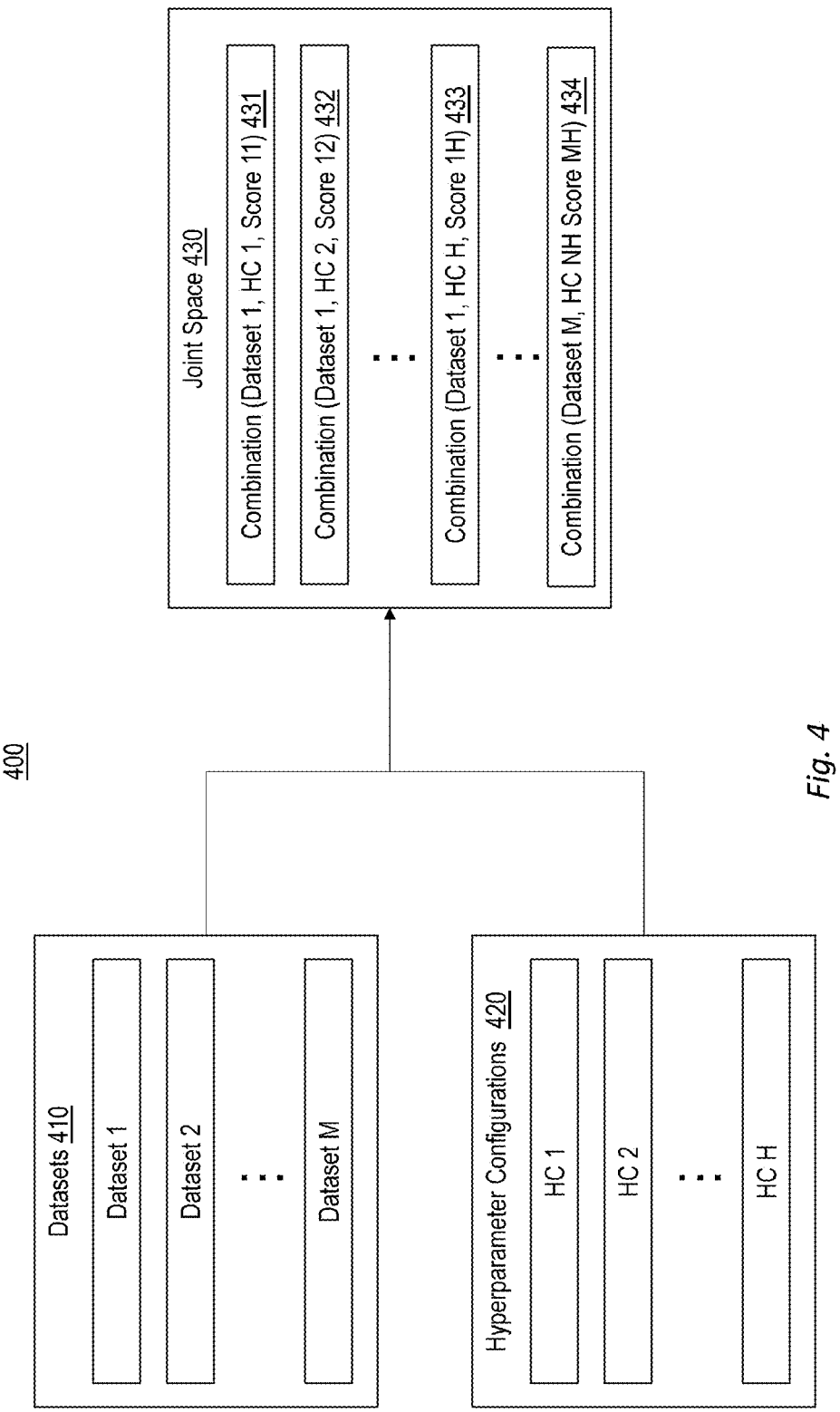
FIG. 4 illustrates an example embodiment of constructing a joint space.

FIG. 4 illustrates an example embodiment 400 of constructing a joint space of tasks and hyperparameter configurations 430. As illustrated in FIG. 4, training datasets 410 (including datasets 1 through M) and hyperparameter configurations 420 (including hyperparameter configurations 1 through H) are used to generate a joint space of tasks and hyperparameter configurations 430. Each M or H is a natural number. For each of the hyperparameter configurations 420 and each of the training datasets 410, a performance score (indicating a performance achieved for the corresponding task using the corresponding hyperparameter configuration) is generated. The corresponding training hyperparameter configuration, training dataset, and performance score form a combination (e.g., a triplet). For example, combination 431 includes dataset 1, hyperparameter configuration 1, performance score 11, combination 432 includes dataset 1, hyperparameter configuration 2, and performance score 12, . . . , combination 433 includes dataset 1, hyperparameter configuration H, and performance score 1H, . . . , and combination 434 includes dataset M, hyperparameter configuration H, and performance score MH.

For example, if there are 10 datasets 410 (i.e. M=10), and 40 hyperparameter configurations 420 (H=40, as that in SE-ResNeXt-50), 400 combinations are generated. As another example, if there are 10 datasets 410 (i.e., M=10), and 108 hyperparameter configurations (H=108, as in Shufflenet-v2-x1), 1080 combinations are generated.

As such, the joint space of tasks and hyperparameter configurations 430 can be represented as T, including a joint space of M datasets and H hyperparameter configurations, which can be defined as $T=\{(D_i,c_j,v_{i,j})|i \in \{1, \ldots, M\}, j \in \{, \ldots, H\}\}$, where $v_{ij}$ is the target performance score (e.g., top-1 accuracy) achieved for an image classifier using the hyperparameter configuration $c_j$ on a dataset $D_i=\{(x_i^k,y_i^k) |k=9, \ldots, N_i\}$, where each $(x_i^k,y_i^k)$ is an image-label pair in $D_i$.

After the joint space of tasks and hyperparameter configurations 430 is constructed, The system can then learn, from the joint space of tasks and hyperparameter configurations 430, to optimize a performance prediction network $f_\theta$ for a neural network architecture, such as ShuffleNet-v2-x1 or SE-ResNeXt-50. The performance prediction network is a function $f$ that regresses the performance of the neural network architecture given a task and a hyperparameter configuration. The objective of the performance prediction network is to estimate the accuracy of a hyperparameter configuration given a task representation and an encoding of the hyperparameter configuration (e.g., learning rate, number of layers to fine-tune, optimizer). In some embodiments, the performance prediction network $f_\theta$ corresponds to a function that regresses the performance v of a deep-learning based image classifier given a dataset or a task D and a hyperparameter configuration encoding C.

Because deriving this function $f$ analytically is challenging for real-world vision tasks, the performance prediction network described herein learns the function $f$ using a deep network $f_\theta$ parameterized with weights $\theta$. However, learning $f_\theta$ requires a tensor-based representation of the dataset t and a tensor-based representation of hyperparameter configuration s, i.e., $v=f_\theta(t,s)$. Thus, to learn function $f$ the system first needs to learn the tensor-based representation of the dataset t and the tensor-based representation of hyperparameter configuration s.

To learn the representation t of the task, a task representation network may be implemented. The task representation network may be represented by the following function: $t=g_{w_t}(D)$. Additionally, to learn the representation s of a hyperparameter configuration, the hyperparameter configurations are first encoded as one-hot vector c. A hyperparameter configuration representation network may then be used to learn the representation s of the hyperparameter configuration. The hyperparameter configuration representation network may be represented by the following function: $s=h_{w_s}(c)$. Based on the learned s and t, the performance prediction network can then be jointly trained. The performance prediction network may be represented by the following function: $v=f_\theta(g_{w_t}(D),h_{w_s}(c))$.

Jointly training the performance prediction network and the representations in an end-to-end fashion constitutes a departure from previous meta learning approaches that represent a task using hand-crafted metadata (e.g., total number of training samples, number of classes, number of samples per class, etc.), performance-based features or globally averaged features from a frozen deep network. This learning process also allows the performance prediction network $f_\theta(.)$ to inform the feature extractors $g_{w_t}(.)$ and $h_{w_s}(.)$ during training about the most useful features for estimating the performance of an image classifier given a task and a hyperparameter configuration.

Figure 5:
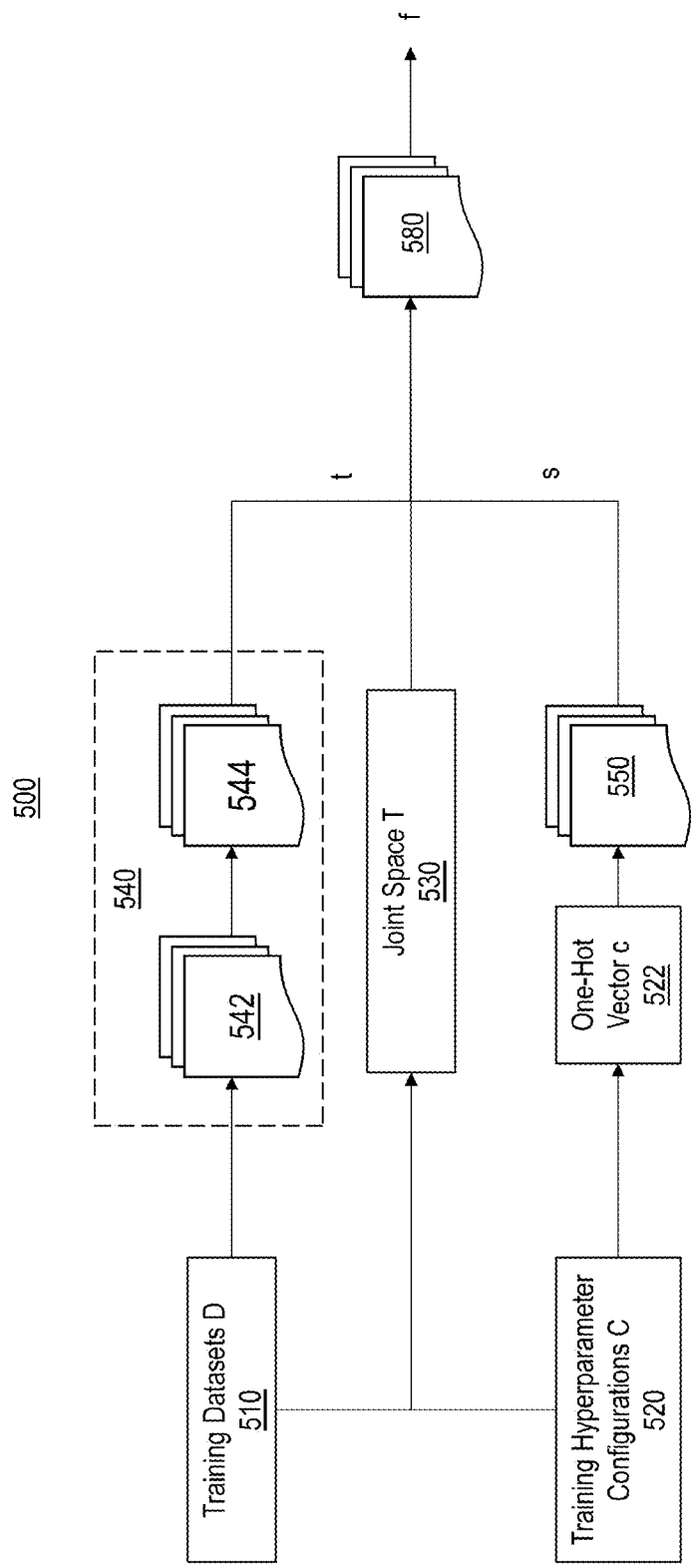
FIG. 5 illustrates an example embodiment of deep learning process of The system.

FIG. 5 illustrates an example deep learning process 500 of The system. Training datasets D 510 and hyperparameter configurations C 520 are used to construct joint space of tasks and hyperparameter configurations T 530. Further, task representation t is learned from training dataset D 510 via a task representation network 540. The task representation t may be learned in an end-to-end manner directly from raw training image dataset D 420 by using a convolutional neural network 542 followed by a transformer layer 544 $t=g_{w_t}(.)$. This learning process enables the use of visual information into the task representation t, leading to improved generalization over unseen vision tasks and making the method end-to-end differentiable.

On the other side, hyperparameter configurations C is first encoded into one-hot vector c 522. Hyperparameter configuration representation s is then learned from the one-hot vector c 522 via a hyperparameter configuration representation network 550. Each of the task representation t or the hyperparameter configuration representation s is a tensor-based representation.

Finally, based on the learned task representation t and configuration representation s, a performance predictor $f$ can then be learned jointly from the previously built joint space of tasks and hyperparameter configurations T via a performance prediction network 580. The optimal parameters for $\theta, w_t, w_s$ are then be found by minimizing the difference between the estimated performance of the performance prediction network and the ground-truth performance score using a mean-based (MB) loss function shown below as Eq. (1).

$$L_{perf}(w_t, w_s, \theta) = \frac{1}{B}\sum_{i=1}^{B} \|v_{ij} - f_\theta(g_{w_t}(D_i), h_{w_s}(c_j))\|_2^2, \quad \text{Eq. (1)}$$

where B is the number of instances in a batch.

In some cases, the raw ground truth performance scores $v_{ij}$ across datasets can have a large variance due to the diversity of task difficulty. In some embodiments, to alleviate the effect of this variance on the performance prediction network, the performance scores may further be normalized as $v_{ij} \leftarrow (v_{ij}-\mu_i)\sigma_i^{-1}$, where $\mu_i$ and $\sigma_i$ are the mean and standard deviation over the performance score of dataset $D_i$ for all hyperparameter configurations, respectively.

In some cases, the objective function may be formulated using a ranking loss. In some cases, applying the above normalization over $v_{ij}$ makes the regression based optimization in Eq. (1) equivalent to a rank-based optimization. In addition, regression-based formulation has the advantage of being more time-efficient than rank-based optimization, because the time complexity of learning a rank-based predictor is O (MH$^2$) while that of a regression-based predictor is O (MH). Consequently, the regression-based performance prediction network can scale favorably to many more datasets.

Further, to learn a more meaningful task representation, a regularizer may also be implemented. The regularizer is configured to impose that two tasks must have similar representations if they have similar hyperparameter-configuration rankings. As such, when the similarity of two task representations differs from a pre-computed task similarity between the two datasets, the learning model will be penalized. The regularizer may be defined by a similarity loss function:

$$L_{sim}(w_t) = \|r_{ij} - d(g_{w_t}(D_i), g_{w_t}(D_j))\|_2^2 \quad \text{Eq. (2)}$$

where $r_{ij}$ is a pre-computed similarity between the i-th and j-th datasets, and $d(g_{w_t}(D_i), g_{w_t}(D_j))$ is the cosine similarity between the two task representations $g_{w_t}(D_i)$ and $g_{w_t}(D_j)$.

In some embodiments, $r_{ij}$ can be pre-computed as Average Precision@K with k=10 (AP@10). Intuitively, $r_{ij}$ is high when the top-k configurations of the two datasets have a large number of entries in common. $L_{sim}(w_t)$ thus helps $g_{w_t}(.)$ push an unseen dataset close to a "similar" seen dataset in the manifold, thereby improving hyperparameter recommendation for this new dataset.

In any given iteration of training The system, an image batch $B_m^i$ may be sampled from a particular dataset $D_m$. One or more datasets may be randomly chosen from remaining training datasets and impose $L_{sim}$ between every two pairs. The similarity regularization is experimentally compared using single pair (BM+Single similarity) and two pairs (BM+Double Similarity). Based on experiments, the BM+Double Similarity has a 2% higher AP@10 compared to BM+Single Similarity, which suggests that introducing a stronger similarity regularization allows for a better representation of the task in the embedding space leading to a higher recommendation performance of The system.

Further, since a hyperparameter configuration space is defined for 108 configurations for ShuffleNet-v2-x1, the hyperparameter configuration space offers an opportunity to explore the impact of using similarity ground truth with different AP@K. Based on experiments, a comparison for different BM+Single similarity settings for different BM+Single Similarity settings for ShuffleNet-v2-x1 for K=10, 25, 40, and 60. As illustrated in the table, the best AP@K is achieved when K=60 is used.

Figure 6:
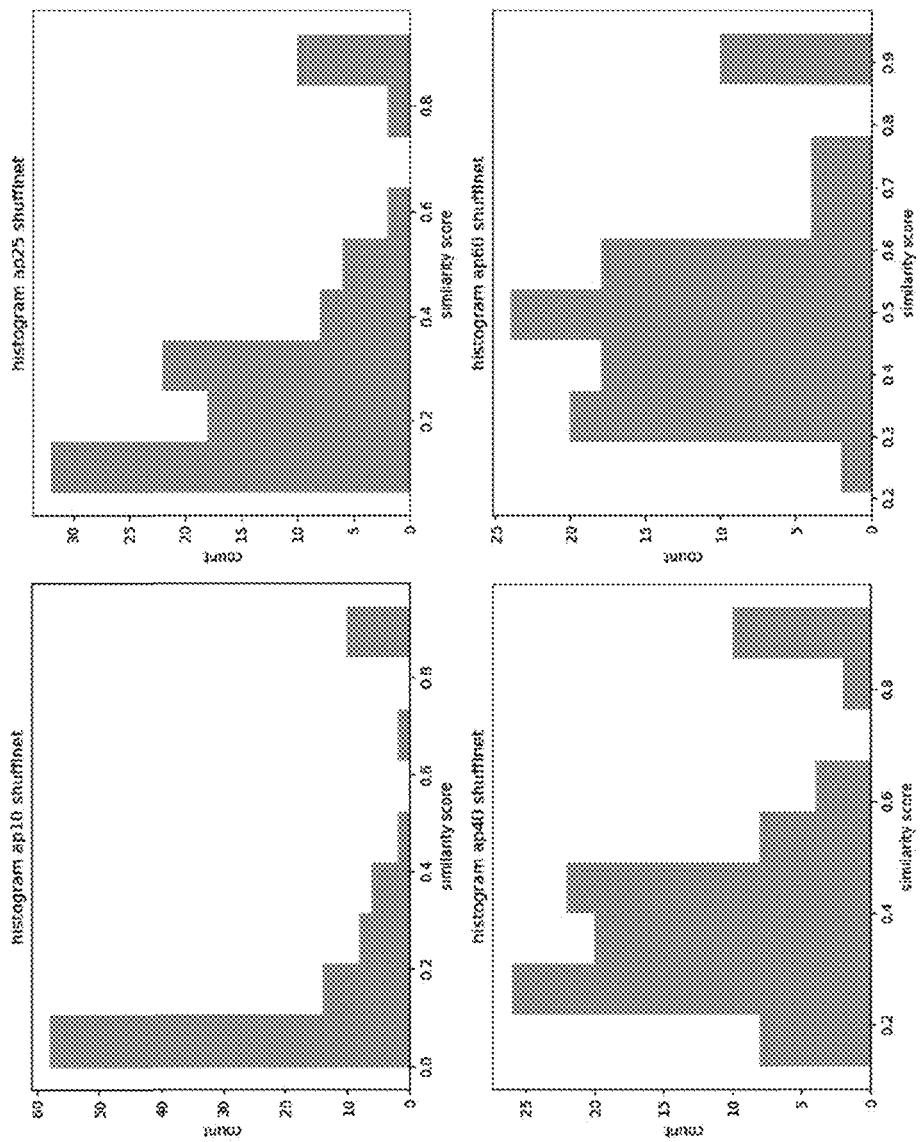
FIG. 6 illustrates effects of K in computing AP@K based similarity ground truth for a similarity loss function.

FIG. 6 further illustrates histograms of the effect of K in computing the AP@K based similarity ground truth for $L_{sim}$. As shown in FIG. 6, the histogram for AP@10 is very sparse with most of the similarity ground truth values close to or equal to 0, because the likelihood of two datasets having common hyperparameter configurations among the top 10 ranks out of 108 is quite small. This also indicates that it is very likely that a hyperparameter configuration among the top 10 best performing configurations for a given dataset might be quite lower in rank for some other dataset, i.e., AP@10 may have low or even zero value for many pairs of datasets. It is also observed that as K increases, the spread of values for AP@K moves increasingly toward 1 with the spread of values being close to normal distribution for AO@60. As such, it is likely that the normality in distribution of AP@60 values may allow the similarity regularization to work consistently good across all datasets when using AP@60 as the similarity ground truth, thereby improving recommendation performance for The system.

Additionally, in order to further optimize Eq. (1), stochastic gradient descent with mini-batch size B may be leveraged. Consequently, this imposes the constraint that a task representation $t_i$ extracted from a batch sampled from a dataset $D_i$ has to be representative of that dataset. In other words, a task representation $t_i^b$ extracted from a batch a sampled from $D_i$ has to e similar to a representation to extracted from a bath b of the same dataset. Therefore, the model is further configured to ensure that the variance among the task representations extracted from any batch of the same dataset to be small. To keep the task representations extracted from batches $(t_i^I)$ to be close to the global representation of the dataset $(t_i^G)$, an adversarial training component may be implemented. The global representation of the dataset may be computed as $$t_i^G = \frac{1}{L}\sum_{l=1}^{L} t_i^l,$$

where the index l runs through a window of the batch-wise representations. Further, a discriminator $d_{w_d}(.)$ may be used to ensure that the batch-wise task representation $t_i^I$ are close to the global representation $t_i^G$. To penalize deviations, the following adversarial loss function may be formulated:

$$L_{adv}(w_t, w_d) = E[\log(d_{w_d}(t_i^G))] + E[\log(1 - d_{w_d}(t_i^I))], \quad \text{Eq. (3)}$$

where E[.] is the expectation operator. An adversarial training component is then chosen to ensure semantic consistency between batch-wise representations $t_i^I$ and the global representation $t_i^G$.

Experiments with different window sizes L for computing the global dataset representation $t_i^G$ has been performed. Three different window sizes that have been experimented with include L=10, L=100, and L=global (where a mean over all batches of a dataset is computed at the beginning of training The system). The result of the experiments show that the best AP@10 is obtained with L=10. It appears that a longer horizon/window size over the processed image batches may lead to information loss due to smoothening out of the feature representation, in turn, impacting the ability of the discriminator to differentiate between resulting aggregated data representation and batchwise representation.

Thus, the longer horizon/window size may affect the effectiveness of the adversarial regularization, leading to reduced performance of The system. On the other hand, a smaller window size appears to keep the variance of global dataset representation in check, in turn, helping the adversarial loss to work well.

In some embodiments, the task representation may be learned based on a combination of Eqs. 1-3. For example, the overall task representation problem may be formulated as $$\min_{w_t, w_s, \Theta} \max_{w_d} L_{perf}(w_t, w_s, \theta) + \alpha L_{sim}(w_t) + \beta L_{adv}(w_t, w_d), \quad \text{Eq. (4)}$$

where $\alpha$ and $\beta$ are loss coefficients. The problem of Eq. 4 can be solved by alternating between optimizing feature extractors $g_{w_t}(.)$, $g_{w_s}(.)$ and discriminator $d_{w_d}(.)$ until convergence.

FIG. 7 illustrates an example training algorithm for the offline meta-learning phase. As illustrated in FIG. 7, the example offline meta-learning phase requires two for-loops. The outer-most for-loop (steps 3-12) samples a meta-batch $C_m$ containing hyperparameter configurations and their performances. The inner most for-loop (steps 6-11) samples image batches from $D_m$ to update the parameters of the predictor and simultaneously aggregate the global representation $t_m$ considering up to the L last image batches. In addition to leveraging stochastic gradient descent as described above, sampling image batches to represent a dataset, compared to a single point estimate, helps the dataset (task) to be modeled as a richer distribution in the dataset-configuration space by effectively acting as data augmentation.

Once the performance prediction network of the system learns to effectively map a dataset-configuration pair to its corresponding performance score in the offline meta learning phase, the performance prediction network can then be used for online recommendation on an unseen dataset $D_{new}$.

Figure 8:
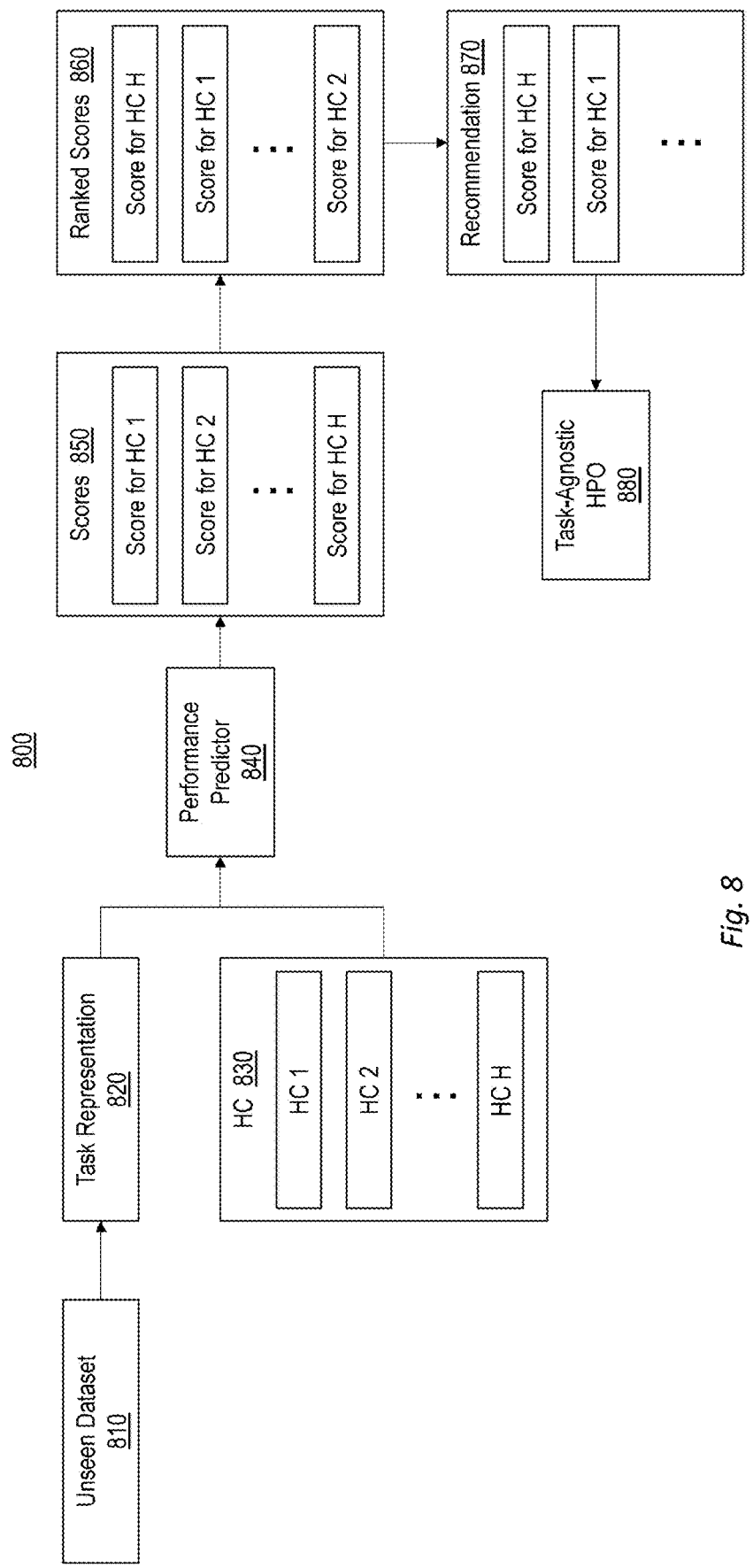
FIG. 8 illustrates an example embodiment of recommending hyperparameter configurations based on an unseen dataset.

FIG. 8 illustrates an example embodiment 800 of recommending hyperparameter configurations based on an unseen dataset $D_{new}$ 810. Since the recommendation process may be provided online to a remote user, this process may also be called an online recommendation phase. The system first extracts a task 820 $t_{new} = g_{w_t}(D_{new})$ for the new dataset. Along with a list of previously-seen hyperparameter configurations 830, the task 820 is then fed into the offline-trained performance predictor 840 $f_\theta(.)$ to predict a sequence of performance scores 850 corresponding to the sequence of configurations 830. In some embodiments, the unseen dataset is sampled, and the task 820 and performance score 850 are generated based on the sampled dataset. In some embodiments, the dataset is sampled multiple times to generate multiple batches of sampled dataset. A performance score is generated for each batch of sampled dataset, and multiple performance scores are averaged to generate the performance score 850. Based on these performance scores 850, the configurations can then be ranked. Based on the ranking 860, a top several ranked configurations may then be recommended as a task-aware recommendation list 870, which can be used to warm-start and guide any of the existing HPO 880.

FIG. 9 illustrates an example recommendation algorithm for the online recommendation phase. As illustrated in FIG. 9, the recommendation algorithm includes two for-loops. The outer-most for-loop (steps 2-9) iterates over all the possible H hyperparameter configurations. For each hyperparameter configuration, the inner-most loop (steps 4-7) samples B batches and predicts the performance for each batch at step 6. At the end of this inner-most loop, all the performance predictions are averaged and use it as the performance estimate for the n-th configuration. Lastly, the algorithm ranks all the configurations based on their estimated performances and returns the ranking.

FIG. 10 illustrates a list of example training parameters and their corresponding example values. These parameters may be used for training The system for both SE-ResNext-50 and ShuffleNet-v2-x1.

FIGS. 11A and 11B illustrate two lists of example hyperparameters used as part of the hyperparameter configurations. Each of the network architectures (e.g., SE-ResNext-50, ShuffleNet-v2-x1) is trained for different hyperparameter configurations. A discrete unordered set of hyperparameters with the different hyperparameters are taken as a grid (Cartesian product) over all combinations. Therefore, the size of hyperparameter configuration space for SE-ResNeXt-50 and ShuffleNet-v2-x1 is 40 and 108 respectively.

For both network architectures, the data augmentation space may include two augmentation policies: (1) "Random Crop", and (2) "Random Affine". Under Random Crop, every time when an image is processed as input to the system, the image is resized, normalized, and randomly cropped based on parameters given in FIG. 11A. Under Random Affine, in addition of doing the process of Random Crop, the image further undergoes an affine transformation with randomly chosen rotation, scaling, and transformation factors as given in FIG. 11A.

As a second hyperparameter dimension, a set of training strategies are chosen. Each training strategy comprises a choice of optimizer. Stochastic Gradient Descent (SGD) may be used for optimizing the multi-class cross entropy loss for the network architecture. The training strategy further comprises a learning rate multiplier for the classifier (fc) layer of the network architecture to incorporate adaptive learning rate for improved performance. For instance, in FIGS. 11A and 11B, refers to training with SGD optimizer using 10 as the learning rate multiplier over the base learning rate for the classifier layer.

As a third hyperparameter dimension, one or more layers of the network are chosen to fine tune. As given in FIGS. 11A and 11B, each value of a hyperparameter suggests the layer name up to where to fine tune the network architecture starting from the classifier. All layers below the specified layer name will be frozen. The position of the layer names can be reference from the network architecture definition. For instance, layer name 5_2 for SE-ResNeXt-50 suggests freezing the network below layer 5_2 and train/finetune the network from 5_2 to the classifier layer.

Further, for SE-ResNeXt-50, the base learning rate to rain for each hyperparameter configuration may be fixed to be 0.001. In case of ShuffleNet-v2-x1, three different base learning rates: 0.001, 0.003, and 0.01 may be explored.

In embodiments, every hyperparameter configuration is a combination of the above-mentioned hyperparameters. For instance, sgd_1_0.001_4_6_random_crop refers to training SE-ResNext-50 with SGD optimizer, base learning rate 0.001, learning rate multiplier of 1 and 'Random Crop' as the data augmentation policy with fine-tuning the network up to layer 4_6.

The other hyperparameters fixed for training both SE-ResNext-50 and Shufflenet-v2-x1 may have a batch size of 45 and 100, respectively, the number of epochs 100 with LR schedule of step size 25 and step decay 0.1, no weight decay and momentum of 0.9 for SGD.

In embodiments, each hyperparameter configuration is represented by a vector that can be fed as input to The system. To vectorize each hyperparameter configuration, each hyperparameter is encoded as one-hot encoding and concatenate each of these one-hot encodings together to form the final vector c. For instance, [0, 0, 1, 0, 0, 0, 1, 0, 0, 0, 1, 0, 0, 1] may be a vector representing the hyperparameter configuration sgd_10_0.003_1_5_random_afffine for Shufflenet-v2-x1. The encoding may be a 14-dimension one-hot vector where dimension 1-3 encodes training strategy (sgd_10), dimension 4-9 encodes fine-tune layer (1_5), dimension 10-12 encodes base learning rate (0.003) and dimension 12-14 encodes augmentation policy (random affine). Similarly, a 13-dimensional vector may be generated to encode each hyperparameter configuration for SE-ResNeXt-50.

FIG. 12 illustrates a table showing information about a list of example datasets (tasks) D that may be used to construct the joint space of tasks and hyperparameter configurations T over the dataset configuration space. For some datasets (such as DeepFashion), a subset of images is taken to keep the time of training for all the datasets and for all the hyperparameter configurations tractable. The table of FIG. 12 also provides information about the metadata features used as part of some of the baseline experiments, where the feature representation comprises metadata relevant to the vision tasks that are considered. In embodiments, the metadata feature vector is a 6-dimension feature vector includes (1) number of training images, (2) number of classes/labels, (3) average number of images per class, (4) log (number of training images), (5) log (number of classes) and (6) log (average number of images per class) in the given order. Since the range of values of each dimension is very different and to balance the effect of each metadata feature dimension, each dimension uses the mean and standard deviation over all the values of that given dimension. As such, each dimension is brought to follow a zero-mean with unit standard deviation normal distribution.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13:
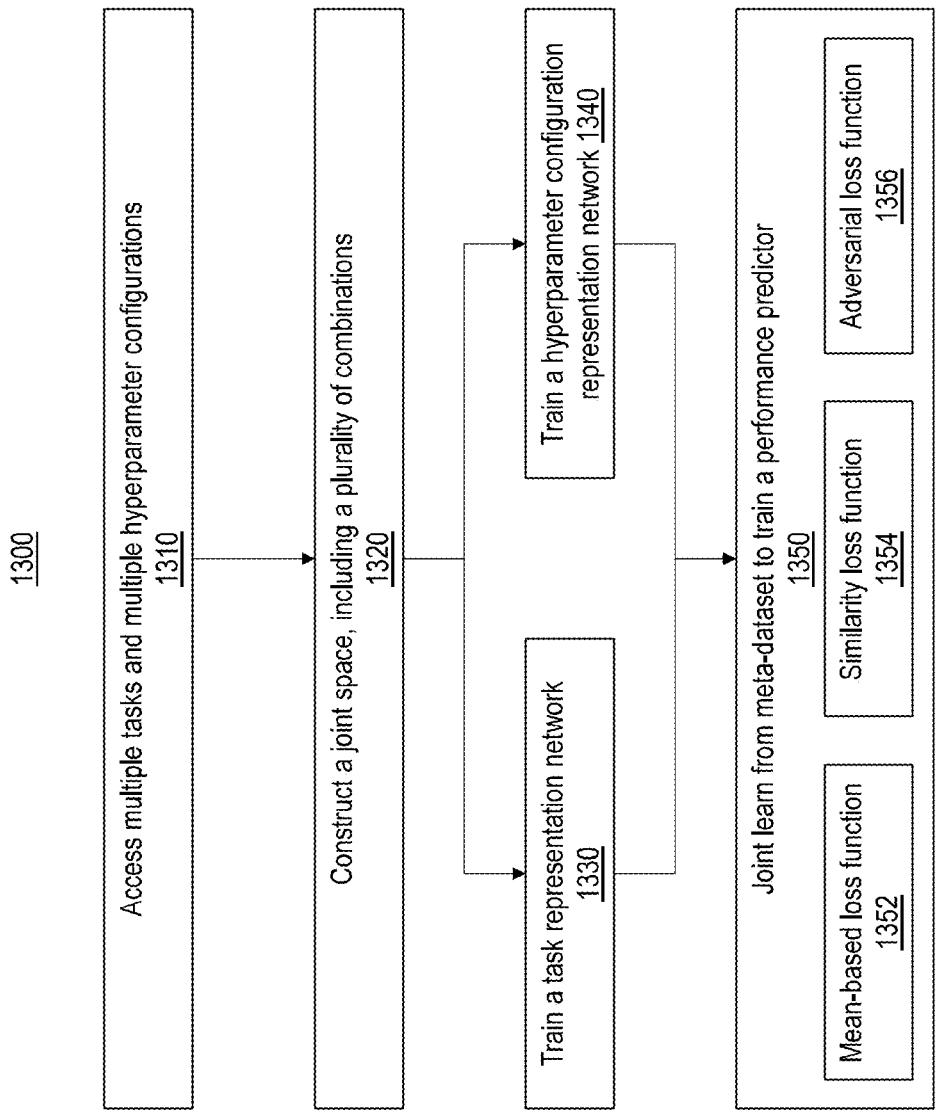
FIG. 13 illustrates a flowchart of an example method for training/optimizing a performance prediction network.

FIG. 13 illustrates a flowchart of an example method 1300 for training/optimizing a performance prediction network for a neural network architecture, which may be performed offline by a computing system at a ML service provider's site. The method 1300 includes accessing multiple tasks and multiple hyperparameter configurations (1310). Each of the multiple tasks corresponds to a dataset. Based on the multiple tasks and hyperparameter configurations, a joint space of tasks and hyperparameter configurations is constructed (1320). The joint space of tasks and hyperparameter configurations includes multiple combinations (e.g., triplets). Each combination includes (1) a task corresponding to a dataset, (2) a hyperparameter configuration, and (3) a performance score indicating a performance achieved for the corresponding task using the corresponding hyperparameter configuration.

The method 1300 further includes learning from the multiple datasets to train a task representation network (1330) and learning from the multiple hyperparameter configurations to train a hyperparameter configuration representation network (1340). Finally, a performance prediction network is jointly learned from the joint space of tasks and hyperparameter configurations using outputs of the task representation network and the hyperparameter configuration representation network (1350). The joint learning may be based on a mean-based loss function (1352) (e.g., Eq. 1). In some embodiments, the joint learning may also be based on a similarity loss function (1354) (e.g., Eq. 2, Eq. 4) or an adversarial loss function (1356) (e.g., Eq. 3, Eq. 4).

Figure 14:
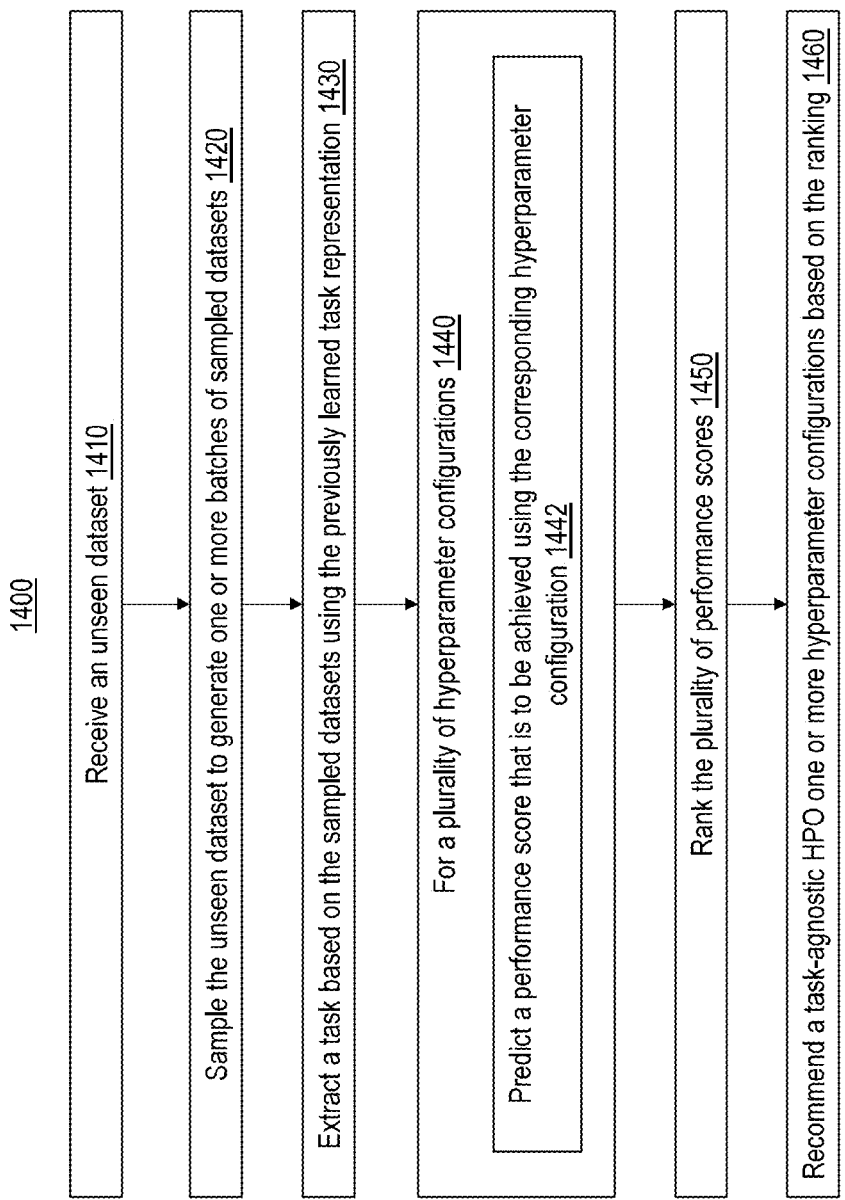
FIG. 14 illustrates a flowchart of an example method for recommending one or more hyperparameters based on an unseen dataset (task)

FIG. 14 illustrates an example method 1400 for recommending one or more hyperparameter configurations based on an unseen task (i.e., dataset), which may be performed online by an ML service provider. The method 1400 includes receiving an unseen dataset (1410). The unseen dataset may be stored at a remote user's site. In some embodiments, the unseen dataset is first sampled to generate one or more batches of sampled datasets (1420). The method 1400 further includes extracting a task based on the sampled datasets using the previously learned task representation (1430). Thereafter, for each of a plurality of hyperparameter configurations (1440), a performance score that is to be achieved using the corresponding hyperparameter is predicted (1442). The generated plurality of performance scores (each of which corresponds to a hyperparameter configuration) are then ranked (1450). Based on the ranking, one or more hyperparameter configurations are recommended to a task-agnostic HPO to warm-start from the top-ranked hyperparameter configurations (1460).

Finally, because the principles described herein may be performed in the context of a computing system (e.g., a computing system of a ML service provider) some introductory discussion of a computing system will be described with respect to FIG. 15.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 15:
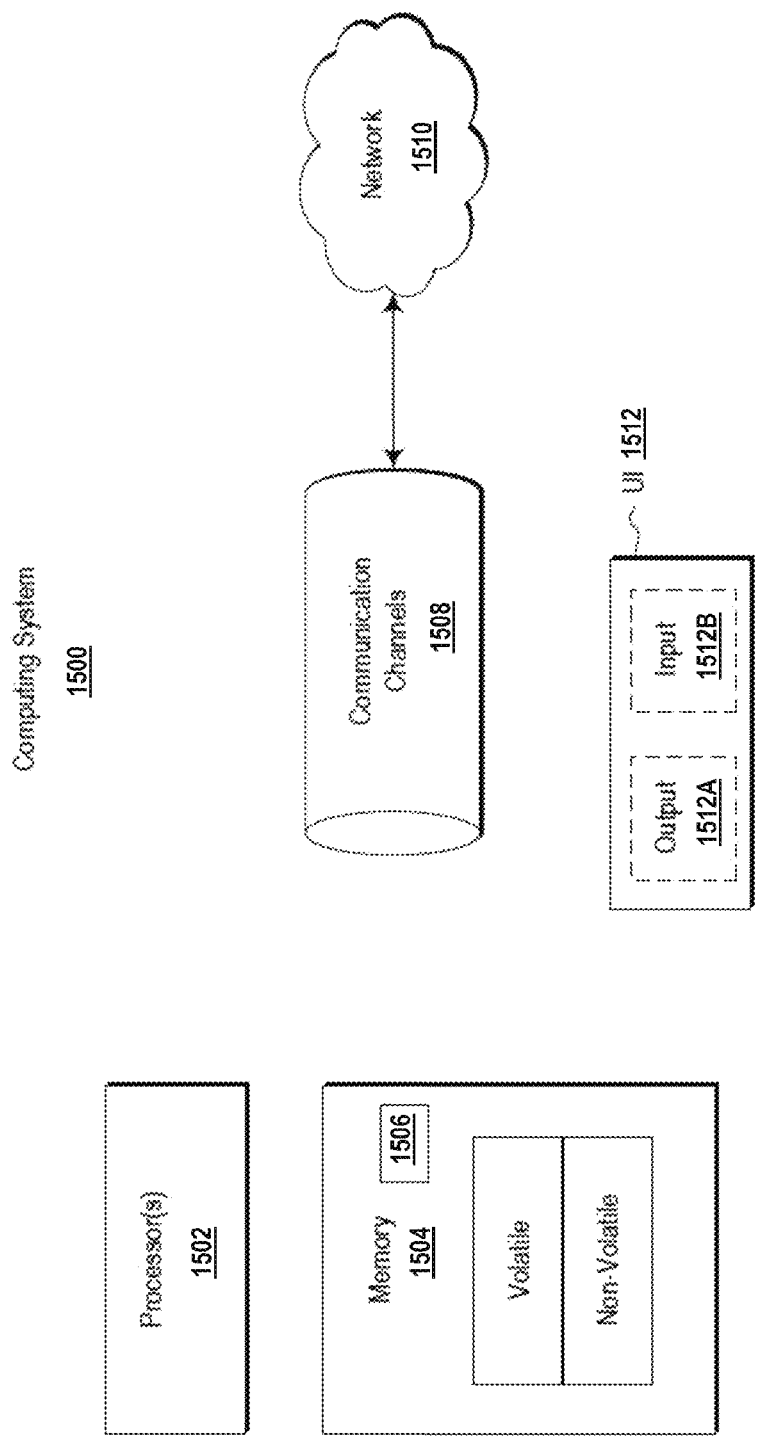
FIG. 15 illustrates an example computing system in which the principles described herein may be employed.

As illustrated in FIG. 15, in its most basic configuration, a computing system 1500 typically includes at least one hardware processing unit 1502 and memory 1504. The processing unit 1502 may include a general-purpose processor and may also include a field-programmable gate array (FPGA), an application-specific integrated circuit (ASIC), or any other specialized circuit. The memory 1504 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 1500 also has thereon multiple structures often referred to as an "executable component." For instance, memory 1504 of the computing system 1500 is illustrated as including executable component 1506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 1504 of the computing system 1500. Computing system 1500 may also contain communication channels 1508 that allow the computing system 1500 to communicate with other computing systems over, for example, network 1510.

While not all computing systems require a user interface, in some embodiments, the computing system 1500 includes a user interface system 1512 for use in interfacing with a user. The user interface system 1512 may include output mechanisms 1512A as well as input mechanisms 1512B. The principles described herein are not limited to the precise output mechanisms 1512A or input mechanisms 1512B as such will depend on the nature of the device. However, output mechanisms 1512A might include, for instance, speakers, displays, tactile output, holograms and so forth. Examples of input mechanisms 1512B might include, for instance, microphones, touchscreens, holograms, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NTC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 1500 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspect of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 1502 and memory 1504, as needed to perform their various functions.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system that trains a deep learning network to recommend hyperparameters for other neural network architectures, said computing system comprising:
   one or more processors; and
   one or more computer-readable media having thereon computer-executable instructions that are executable by the one or more processors to cause the computing system to:
   access a plurality of tasks and a plurality of hyperparameter configurations of a neural network architecture, each task corresponding to a training dataset such that a plurality of training datasets are accessed;
   construct a joint space of tasks and hyperparameter configurations using the plurality of training datasets and the plurality of hyperparameter configurations, the joint space comprising a plurality of combinations, each combination including (1) one task included in the plurality of the tasks, (2) one hyperparameter configuration included in the plurality of hyperparameter configurations, and (3) a performance score indicating a performance achieved for the corresponding task using the corresponding hyperparameter configuration;
   train a performance prediction network to predict a performance of hyperparameter configurations for unseen datasets using training data comprising the constructed joint space, said training of the performance prediction network comprising a joint training operation in which the plurality of tasks and the plurality of hyperparameter configurations are relied on to perform said training; and
   predict a performance score of the neural network architecture for an unseen task of the plurality of tasks based on a hyperparameter configuration of the plurality of hyperparameter configurations.

2. The computing system of claim 1, the constructing the joint space comprising:
   for each of the plurality of tasks and each of the plurality of hyperparameter configurations, determine a corresponding performance score indicating a performance of the neural network architecture achieved for the corresponding hyperparameter configuration.

3. The computing system of claim 2, the determining each performance score comprising determining a raw score of Top-1 accuracy achieved for the neural network architecture using the corresponding hyperparameter configuration on the corresponding training task, such that multiple raw scores are determined.

4. The computing system of claim 3, wherein the raw scores are normalized based on a mean and a standard deviation over the raw scores.

5. The computing system of claim 4, the training the performance prediction network comprising:
   training a task representation network using the plurality of tasks for extracting a task representation for each dataset;
   training a hyperparameter configuration representation network using the plurality of hyperparameter configurations for extracting a hyperparameter configuration representation for each hyperparameter configuration; and
   performing the joint training operation by training the performance prediction network using outputs of the task representation network and the hyperparameter configuration representation network.

6. The computing system of claim 5, the joint training operation is configured to minimize differences between predicted performances generated by the performance prediction network and performance scores included in the plurality of combinations.

7. The computing system of claim 6, wherein the differences between predicted performances generated by the performance prediction network and the performance scores included in the plurality of combinations are represented using a mean-based loss function.

8. The computing system of claim 7, the joint training operation further comprising a regularizer or an adversarial training component,
   the regularizer configured to penalize the learned performance prediction network by the mean-based loss function when a similarity of two task representations extracted by the task representation network differs from a pre-computed task similarity between two datasets corresponding to the two tasks, and
   the adversarial training component configured to keep batchwise task representations extracted from different batches of sampled data by the task representation network to be close to a global representation of the corresponding dataset.

9. The computing system of claim 8, a difference between the similarity of two task representations and a pre-computed task similarity between the two corresponding datasets being represented using a similarity loss function.

10. The computing system of claim 8, the adversarial training component configured to:
   extract a plurality of batchwise task representations by the task representation network, each of which is calculated using a batch of predetermined number of sampled data contained in a dataset;
   extract the global representation of the dataset using the plurality of batchwise data representations; and
   use a discriminator to ensure that each batchwise data representation is close to the global representation of the dataset.

11. The computing system of claim 10, wherein the ensuring that each batchwise data representation is close to the global representation of the dataset includes penalizing a deviation between each batchwise task representation and the global representation.

12. The computing system of claim 11, wherein the deviation between each batchwise task representation and the global representation is represented by an adversarial loss function.

13. The computing system of claim 1, the computing system further caused to:
   receive an unseen dataset;
   extract a task representation corresponding to the unseen dataset using the trained task representation network; and
   predict a performance score that is to be achieved for the task representation using a hyperparameter configuration based on the trained performance prediction network.

14. The computing system of claim 13, the computing system further caused to sample the unseen data one or more times to generate one or more batches of sampled datasets.

15. The computing system of claim 14, the extracting the task or the predicting the performance score is based on the one or more batches of sampled datasets.

16. The computing system of claim 15, wherein a sub performance score is predicted for each of the one or more batches of sampled datasets, and the one or more sub performance scores are averaged as the performance score.

17. The computing system of claim 13, the computing system further caused to:
   for each of the plurality of hyperparameter configurations, predict a corresponding performance score that is to be achieved for the unseen task using the corresponding hyperparameter configuration;
   rank the plurality of performance scores, each of which corresponding to one of the plurality of hyperparameter configurations; and
   based on the ranking, recommend one or more hyperparameter configurations to a task-agnostic hyperparameter optimization system (HPO), such that the task-agnostic HPO can warm-start from a top-ranked hyperparameter configurations.

18. A method implemented at a computing system for training a deep learning network to recommend hyperparameters for other neural network architectures, the method comprising:
   accessing a plurality of tasks and a plurality of hyperparameter configurations of a neural network architecture, each task corresponding to a training dataset such that a plurality of training datasets are accessed;
   constructing a joint space of tasks and hyperparameter configurations using the plurality of training datasets and the plurality of hyperparameter configurations, the joint space comprising a plurality of combinations, each combination including (1) one task included in the plurality of the tasks, (2) one hyperparameter configuration included in the plurality of hyperparameter configurations, and (3) a performance score indicating a performance achieved for the corresponding task using the corresponding hyperparameter configuration;
   training a performance prediction network to predict a performance of hyperparameter configurations for unseen datasets using training data comprising the constructed joint space, said training of the performance prediction network comprising a joint training operation in which the plurality of tasks and the plurality of hyperparameter configurations are relied on to perform said training; and
   predicting a performance score of the neural network architecture for an unseen task of the plurality of tasks based on a hyperparameter configuration of the plurality of hyperparameter configurations.

19. The method of claim 18, the method further comprising:
receiving an unseen dataset;
for each of a plurality of hyperparameter configurations, predicting a corresponding performance score that is to be achieved for the unseen task using the corresponding hyperparameter configuration;
ranking the plurality of performance scores, each of which corresponds to one of the plurality of hyperparameter configurations; and
based on the ranking, recommending one or more hyperparameter configurations to a task-agnostic hyperparameter optimization system (HPO), such that the task-agnostic HPO can warm-start from a top-ranked hyperparameter configurations.

20. A computer program product comprising one or more hardware storage devices having stored thereon computer-executable instructions that are executable by one or more processors of a computing system to cause the computer system to:
access a plurality of tasks and a plurality of hyperparameter configurations of a neural network architecture, each task corresponding to a training dataset such that a plurality of training datasets are accessed;
construct a joint space of tasks and hyperparameter configurations using the plurality of training datasets and the plurality of hyperparameter configurations, the joint space comprising a plurality of combinations, each combination including (1) one task included in the plurality of the tasks, (2) one hyperparameter configuration included in the plurality of hyperparameter configurations, and (3) a performance score indicating a performance achieved for the corresponding task using the corresponding hyperparameter configuration;
train a performance prediction network to predict a performance of hyperparameter configurations for unseen datasets using training data comprising the constructed joint space, said training of the performance prediction network comprising a joint training operation in which the plurality of tasks and the plurality of hyperparameter configurations are relied on to perform said training; and
predict a performance score of the neural network architecture for an unseen task of the plurality of tasks based on a hyperparameter configuration of the plurality of hyperparameter configurations.

* * * * *